(12) United States Patent
Cheng

(10) Patent No.: US 10,704,672 B1
(45) Date of Patent: Jul. 7, 2020

(54) ACTIVELY RESTORABLE GEAR SHIFTING DEVICE AND GEAR SHIFTING METHOD USING THE SAME

(71) Applicants: Hyundai Motor Company, Seoul (KR); Kia Motors Corporation, Seoul (KR)

(72) Inventor: Chao Cheng, Shandong (CN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/458,861

(22) Filed: Jul. 1, 2019

(30) Foreign Application Priority Data

Jan. 23, 2019 (CN) .......................... 2019 1 0062449

(51) Int. Cl.
*G05G 1/04* (2006.01)
*F16H 59/02* (2006.01)
*F16D 41/12* (2006.01)
*F16H 59/00* (2006.01)

(52) U.S. Cl.
CPC ......... *F16H 59/0278* (2013.01); *F16D 41/12* (2013.01); *F16H 59/0208* (2013.01); *F16H 2059/006* (2013.01); *F16H 2059/0295* (2013.01)

(58) Field of Classification Search
CPC .. G05G 1/04; G05G 1/05; G05G 5/03; G05G 5/05; G05G 5/06; G05G 5/065; G05G 5/18; G05G 5/24; G05G 5/20; G05G 5/14; F16H 59/0278; F16H 59/02; F16H 2059/0282
See application file for complete search history.

(56) References Cited

U.S. PATENT DOCUMENTS

| 2,672,061 | A | * | 3/1954 | Gardner | G05G 5/18 74/530 |
| 4,846,322 | A | * | 7/1989 | Swank | F16H 59/10 192/219.4 |
| 5,758,547 | A | * | 6/1998 | Smale | G05G 1/04 74/516 |
| 9,056,391 | B1 | * | 6/2015 | Wu | B25B 23/141 |
| 9,109,688 | B2 | * | 8/2015 | Beaufils | B60T 7/102 |
| 2002/0089225 | A1 | * | 7/2002 | Bruck | B60N 2/2352 297/378.11 |
| 2006/0070485 | A1 | * | 4/2006 | Revelis | B60T 7/045 74/540 |

(Continued)

*Primary Examiner* — Richard W Ridley
*Assistant Examiner* — Brian J McGovern
(74) *Attorney, Agent, or Firm* — Mintz Levin Cohn Ferris Glovsky and Popeo, P.C.; Peter F. Corless

(57) ABSTRACT

An actively restorable gear shifting device and a gear shifting method using the same are provided. The gear shifting device includes a gear shifting lever unit that is moved from an initial position to an operating position by external operating force and is connected to a restoring mechanism to be restored to the initial position when the operating force is eliminated. A driving gear is connected to the gear shifting lever unit to be rotated by a motion of the gear shifting lever unit. A driven gear engages with an outer tooth portion of the driving gear, connects to a gear shifting cable, and implements gear shifting by pushing or pulling the gear shifting cable by a rotation of the driving gear. The gear shifting lever unit is connected to the driving gear by a pawl, and the pawl has a first joining position and a second joining position.

17 Claims, 12 Drawing Sheets

(56) References Cited

U.S. PATENT DOCUMENTS

| | | | |
|---|---|---|---|
| 2006/0181131 A1* | 8/2006 | Kienke | B60N 2/2352 297/367 R |
| 2013/0098195 A1* | 4/2013 | Thielvoldt | G05G 1/04 74/502.2 |
| 2018/0283543 A1* | 10/2018 | Cha | F16H 61/22 |
| 2019/0070982 A1* | 3/2019 | Kajino | B60N 2/1615 |
| 2019/0211916 A1* | 7/2019 | Morimura | F16H 61/22 |

* cited by examiner

ACTIVELY RESTORABLE GEAR SHIFTING DEVICE AND GEAR SHIFTING METHOD USING THE SAME

CROSS-REFERENCE TO RELATED APPLICATION

This application claims priority to and the benefit of Chinese Patent Application No. 201910062449.3 filed on Jan. 23, 2019, the entire contents of which are incorporated herein by reference.

BACKGROUND

(a) Field of the Invention

The present invention relates to an actively restorable gear shifting device and a gear shifting method using the same, and more particularly, to a gear shifting device capable of maintaining stability of mechanical gear shifting and implementing an electronic gear shifting mode such as shift by wire (SBW).

(b) Description of the Related Art

Recently, many vehicles use mechanical gear shifting such as a shift by cable (SBC) gear shifting system. The mechanical gear shifting implements gear shifting through power transmission between mechanical structures and has high stability and reliability. With the development of smart vehicles and as the technological advances, electronic gear shifting (shift by wire, SBW) has begun to be applied to high-grade passenger vehicles. The electronic gear shifting implements the gear shifting using an electronic control operation without requiring mechanical power transmission mechanisms. In the electronic gear shifting mode, a driver may complete the gear shifting for each gear position by minimally pushing or pulling a gear shifting lever. After the gear shifting, the gear shifting lever automatically returns to an initial position.

The electronic gear shifting has an advantage in that the electronic gear shifting reduces a driver's operating effort to enable the driver to more easily and conveniently perform the gear shifting, and an external appearance of the electronic gear shifting lever appears more technically sensible. When the SBW is applied instead of the mechanical gear shifting, an actuator is required to be added to a transmission, and a wire harness system also needs to be changed correspondingly, and as a result, costs of the electronic gear shifting system are increased. In addition, the electronic gear shifting depends on control of electrical signals. Accordingly, stability and reliability of the electronic gear shifting are also lower than those of the mechanical gear shifting, and as a result, there is a safety risk such as a risk that the vehicle is unable to operate normally in the event of a power and circuit failure.

The above information disclosed in this section is merely for enhancement of understanding of the background of the invention and therefore it may contain information that does not form the prior art that is already known in this country to a person of ordinary skill in the art.

SUMMARY

The present invention provides an actively restorable gear shifting device and a gear shifting method using the same, which are capable of maintaining stability of mechanical gear shifting and implementing an electronic gear shifting mode such as shift by wire (SBW).

An exemplary embodiment of the present invention provides an actively restorable gear shifting device that may include: a gear shifting lever unit configured to be moved from an initial position to an operating position by external operating force and connected to a restoring mechanism to be restored to the initial position when the operating force is eliminated; a driving gear coupled to the gear shifting lever unit to be rotated by a motion of the gear shifting lever unit; and a driven gear which engages with an outer tooth portion of the driving gear, connects to a gear shifting cable, and implements gear shifting by pushing or pulling the gear shifting cable using a rotation of the driving gear. The gear shifting lever unit may be coupled to the driving gear via a pawl, and the pawl may have a first joining position and a second joining position.

When the pawl is coupled to the driving gear at a first joining position, the driving gear may rotate in a first rotation direction by first directional operating force applied to the gear shifting lever unit, the driven gear may rotate in a second rotation direction, and the gear shifting cable may be pushed. When the pawl is coupled to the driving gear at a second joining position, the driving gear may rotate in the second rotation direction by second directional operating force applied to the gear shifting lever unit, the driven gear may rotate in the first rotation direction, and the gear shifting cable may be pulled. In particular, the first direction and the second direction are opposite to each other, and the first rotation direction and the second rotation direction are also opposite to each other.

According to the exemplary embodiment of the present invention, the gear shifting lever unit may include: a handle mounted on an upper portion of the gear shifting lever; and a rotating plate mechanism having a rotating plate main body, and a rotating plate shaft installed on a first axially lateral surface of the rotating plate main body and connected to a lower portion of the gear shifting lever. The rotating plate mechanism may be rotated in the first rotation direction from the initial position by the first directional operating force applied to the handle, and the rotating plate mechanism may be rotated in the second rotation direction from the initial position by the second directional operating force applied to the handle.

Additionally, the restoring mechanism may include a guide member and an elastic restoring contactor both fixedly installed at an outer portion of the rotating plate mechanism, a first guide groove, a second guide groove, and a position fixing groove may be disposed in a lateral surface of the guide member that faces the rotating plate mechanism. The position fixing groove may be disposed between the first guide groove and the second guide groove and connected to the first guide groove and the second guide groove. A first end of the elastic restoring contactor may be elastically joined to the rotating plate mechanism, and a second end of the elastic restoring contactor may be positioned and fixed in the position fixing groove by elastic force when the rotating plate mechanism does not rotate.

The elastic restoring contactor may be moved from the position fixing groove along the first guide groove or the second guide groove by operating force applied to the handle along with the rotation of the rotating plate mechanism. When the operating force is eliminated, the elastic restoring contactor may be restored to the position fixing groove from the first guide groove or the second guide groove, and the rotating plate mechanism, the gear shifting lever, and the handle may return to the initial position.

Further, each of the first guide groove and the second guide groove may have a gradient to be inclined toward the rotating plate mechanism and/or each of the first guide groove and the second guide groove may have a degree of curvature to be curved toward the rotating plate mechanism.

According to another exemplary embodiment of the present invention, the rotating plate mechanism may further include an elastic contactor mounting holder, and the elastic restoring contactor may be elastically mounted, by a restoring spring, on the elastic contactor mounting holder. The pawl may include a rotation base portion, and a first pawl arm and a second pawl arm which protrude from the rotation base portion and define a predetermined angle therebetween. The driving gear may have an annular shape, an inner tooth portion may be disposed on an inner circumferential surface of the driving gear, and tooth portions, which correspond to the inner tooth portion, may be disposed at a free end of the first pawl arm and a free end of the second pawl arm, respectively.

Additionally, a pawl mounting holder may be installed on a second axially lateral surface of the rotating plate main body. The pawl mounting holder may include a mounting recess which is matched with the rotation base portion of the pawl. The pawl mounting holder may further include a first joining surface and a second joining surface disposed at both sides of the mounting recess and define a predetermined angle therebetween, and the rotation base portion may be rotatable in the mounting recess.

According to another exemplary embodiment of the present invention, the angle between the first pawl arm and the second pawl arm may be less than the angle between the first joining surface and the second joining surface. The first pawl arm and the second pawl arm may be positioned between the first joining surface and the second joining surface. A length of the first pawl arm and a length of the second pawl arm may satisfy a condition in which at the first joining position, the tooth portion at the free end of the first pawl arm and the inner tooth portion of the driving gear engage with each other, but the tooth portion at the free end of the second pawl arm and inner tooth portion of the driving gear do not engage with each other, and a lateral surface of the first pawl arm is joined to the first joining surface, and at the second joining position, the tooth portion at the free end of the second pawl arm and the inner tooth portion of the driving gear engage with each other, but the tooth portion at the free end of the first pawl arm and the inner tooth portion of the driving gear do not engage with each other, and a lateral surface of the second pawl arm is joined to the second joining surface. The pawl may further include an intermediate position, and the first pawl arm and the second pawl arm may not engage with the driving gear at the intermediate position.

The actively restorable gear shifting device may further include a rotating member installed on the second axially lateral surface of the rotating plate main body and positioned between the first pawl arm and the second pawl arm, an elastic rotating contactor, elastically in contact with the pawl and elastically coupled to the rotating member. The pawl may be positioned at the intermediate position when the elastic rotating contactor of the rotating member abuts the first pawl arm and the second pawl arm between the first pawl arm and the second pawl arm. Additionally, the pawl may be positioned at the first joining position when the rotating member rotates and the elastic rotating contactor abuts the first pawl arm, and the pawl may be positioned at the second joining position when the rotating member rotates and the elastic rotating contactor abuts the second pawl arm.

According to another exemplary embodiment of the present invention, a button may be installed on the handle and may be connected to the rotating member via a power transmission pin and a connecting member and may be configured to adjust the rotation of the rotating member. The elastic rotating contactor of the rotating member may abut the first pawl arm and the second pawl arm between the first pawl arm and the second pawl arm and the pawl may be positioned at the intermediate position when the button is disengaged. The rotating member may rotate in the first rotation direction to allow the elastic rotating contactor to abut the first pawl arm and the pawl may be positioned at the first joining position when a lower portion of the button is pushed. The rotating member may rotate in the second rotation direction to allow the elastic rotating contactor to abut the second pawl arm and the pawl may be positioned at the second joining position when an upper portion of the button is pushed.

The gear shifting lever may have a vertically long groove to mount the power transmission pin is mounted therein. A first end of the power transmission pin may be connected to the button via a connecting member installed in the gear shifting lever, and a second end of the power transmission pin may protrude outward from the gear shifting lever through the long groove and connect to the rotating member. According to another exemplary embodiment of the present invention, a fork member for coupling the power transmission pin may be connected to the rotating member via a rotating shaft that penetrates the rotating plate main body, and the fork member may have a slot into which the power transmission pin may be inserted.

Further, the power transmission pin may be positioned at an middle portion of the long groove when the button is disengaged. The power transmission pin may move downward along the long groove from the middle portion of the long groove to allow the rotating member to rotate in the first rotation direction when the lower portion of the button is pushed. Additionally, the power transmission pin may move upward along the long groove from the middle portion of the long groove to allow the rotating member to rotate in the second rotation direction when the upper portion of the button is pushed.

Another exemplary embodiment of the present invention provides a gear shifting method using the actively restorable gear shifting device, the gear shifting method may include: positioning the pawl at the first joining position or the second joining position; implementing gear shifting by rotating the driving gear in the first rotation direction to rotate the driven gear in the second rotation direction and push the gear shifting cable by applying the first directional operating force to the gear shifting lever unit when the pawl is coupled to the driving gear at the first joining position, or implementing gear shifting by rotating the driving gear in the first rotation direction to rotate the driven gear in the second rotation direction and pull the gear shifting cable by applying the second directional operating force to the gear shifting lever unit when the pawl is coupled to the driving gear at the second joining position; and restoring the gear shifting lever unit from the operating position to an initial position by eliminating the operating force when the gear shifting is complete.

The following effects may be obtained by the present invention with combinations of the above-mentioned exemplary embodiments and structures and operational relationships between the structures which will be described below. The present invention may implement the gear shifting function and maintain stability of the mechanical gear shifting, and as a result, it may be possible to implement the electronic gear shifting mode such as shift by wire (SBW) by changing the gear shifting device without changing other members in the mechanical gear shifting system (e.g., the shift by cable (SBC) gear shifting system) in the related art. Accordingly, the present invention improves a user's driving experience and decreases costs in comparison with the SBW.

BRIEF DESCRIPTION OF THE DRAWINGS

Hereinafter, the present invention will be described in detail with reference to exemplary embodiments illustrated in the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
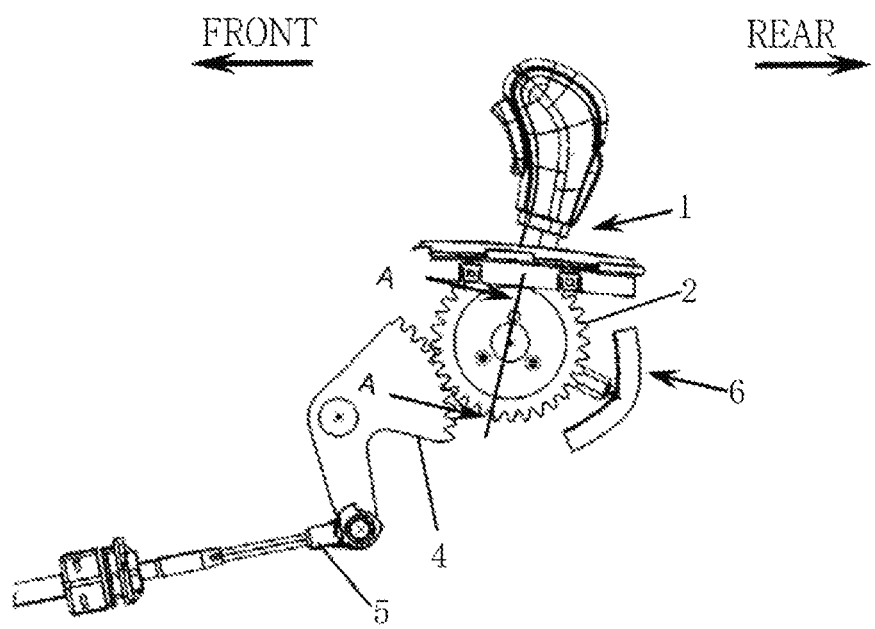
FIG. 1 is a schematic structural view of an actively restorable gear shifting device according to an exemplary embodiment of the present invention.

As illustrated in FIG. 1, an actively restorable gear shifting device according to an exemplary embodiment of the present invention may include: a gear shifting lever unit 1 configured to be moved from an initial position to an operating position by external operating force and connected to a restoring mechanism 6 to be restored to the initial position when the operating force is eliminated; a driving gear 2 coupled to the gear shifting lever unit 1 to be rotated by a motion of the gear shifting lever unit 1; and a driven gear 4 which engages with an outer tooth portion 21 of the driving gear 2, connects to a gear shifting cable 5, and implements gear shifting by pushing or pulling the gear shifting cable 5 by a rotation of the driving gear 2. The gear shifting device may maintain stability of mechanical gear shifting, and enable the gear shifting lever unit 1 to be actively restored to the initial position without a separate operation after completing the gear shifting, like electronic gear shifting.

Figure 2:
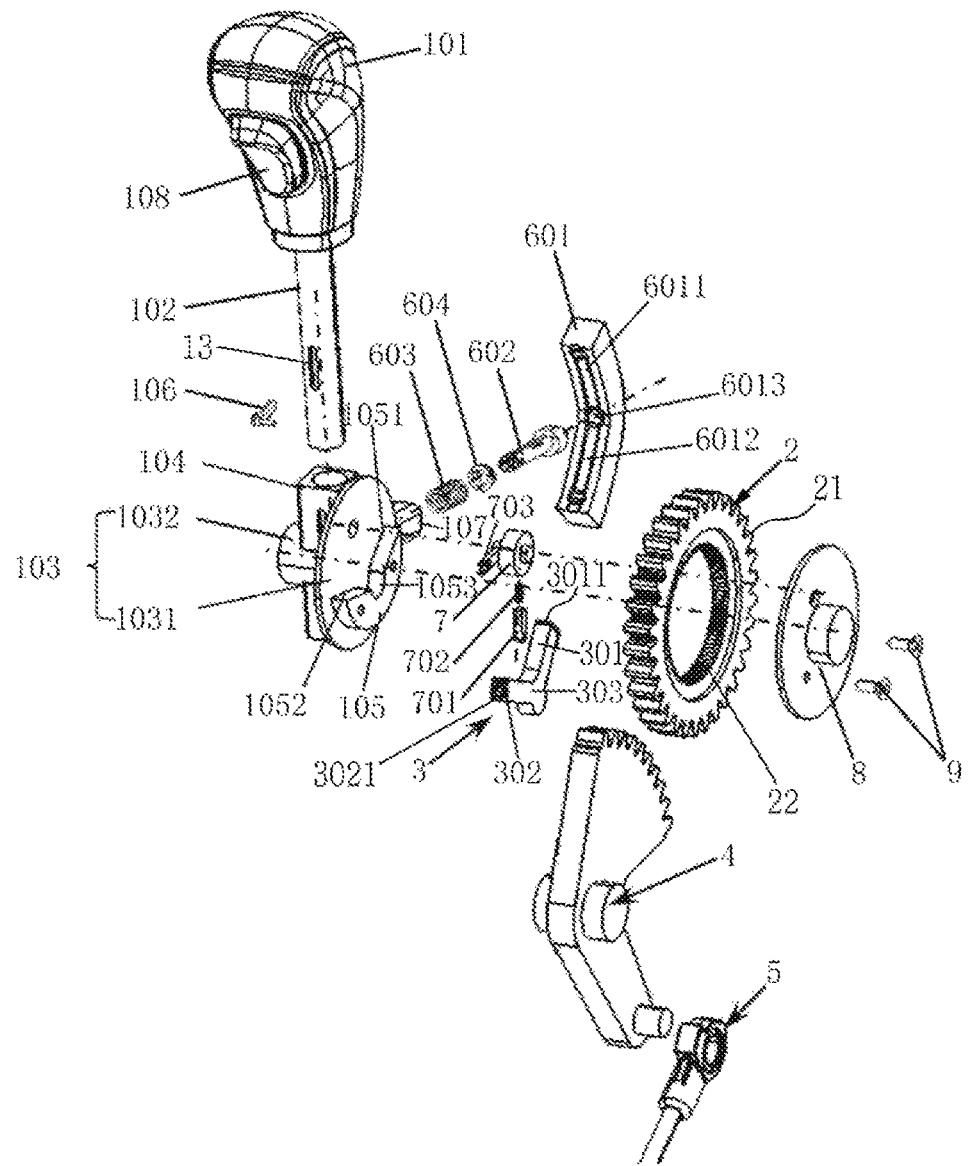
FIG. 2 is a detailed view of the actively restorable gear shifting device according to the exemplary embodiment of the present invention.

As illustrated in FIG. 2, according to the exemplary embodiment of the present invention, the gear shifting lever unit 1 may include: a handle 101 mounted on an upper portion of the gear shifting lever 102; and a rotating plate mechanism 103 having a rotating plate main body 1031, and a rotating plate shaft 1032 installed on a first axially lateral surface of the rotating plate main body 1031 and connected to a lower portion of the gear shifting lever 102. A sleeve 104 may be connected to the rotating plate shaft 1032, and a lower portion of the gear shifting lever 102 may be mounted in the sleeve 104. When operating force is applied by a driver to the handle 101, the rotating plate main body 1031 may be rotated. The rotating plate mechanism 103 may be rotated counterclockwise by forward operating force applied to the handle 101 based on the initial position, and the rotating plate mechanism 103 may be rotated clockwise by rearward operating force applied to the handle 101 based on the initial position.

The driving gear 2 may be rotatably supported by the rotating plate main body 1031 and a gear cover 8 which are positioned at both axial sides of the driving gear 2. Rotation grooves, which correspond to the rotating plate main body 1031 and the gear cover 8, respectively, may be disposed in both surfaces of the driving gear 2, and the gear cover 8 may be fixed to the rotating plate mechanism 103 by screws 9 or other fastening mechanisms. The initial position refers to a position at which the handle 101, the gear shifting lever 102, and the rotating plate mechanism 103 are in a natural state when no operating force is applied.

As illustrated in FIGS. 1 and 2, according to the exemplary embodiment of the present invention, the restoring mechanism 6 may include a guide member 601 and an elastic restoring contactor 602 both fixedly installed at an outer portion of the rotating plate mechanism 103. The guide member 601 may be fixedly installed by a support (not illustrated). In the present exemplary embodiment, the guide member 601 may be fixedly installed at a rear side of the rotating plate mechanism 103 based on the gear shifting lever 102, but the position of the guide member 601 is not limited thereto.

A first guide groove 6011, a second guide groove 6012, and a position fixing groove 6013 may be provided in a lateral surface of the guide member 601 that faces the rotating plate mechanism 103. The position fixing groove 6013 may be disposed between the first guide groove 6011 and the second guide groove 6012 and connected to the first guide groove 6011 and the second guide groove 6012. As illustrated in FIG. 2, the first guide groove 6011 may be disposed at an upper side of the position fixing groove 6013, and the second guide groove 6012 may be disposed at a lower side of the position fixing groove 6013. A first end of the elastic restoring contactor 602 may be elastically coupled to the rotating plate mechanism 103.

The rotating plate mechanism 103 may further include an elastic contactor mounting holder 107, and the elastic contactor mounting holder 107 may include a mounting aperture. The elastic restoring contactor 602 may be elastically mounted, by a restoring spring 603, in the mounting aperture of the elastic contactor mounting holder 107. A first end of the restoring spring 603 may be supported, by a spring seat 604, on the elastic restoring contactor 602, and a second end of the restoring spring 603 may be supported on the elastic contactor mounting holder 107. When the rotating plate mechanism 103 does not rotate, the second end of the elastic restoring contactor 602 may be positioned and fixed, by elastic force, in the position fixing groove 6013.

When the forward operating force (e.g., in a direction toward a front side based on FIG. 1 that corresponds to a direction toward a front side of a vehicle) is applied to the handle 101, the rotating plate mechanism 103 may be configured to rotate counterclockwise, and the elastic restoring contactor 602 may move from the position fixing groove 6013 along the first guide groove 6011 together with the rotation of the rotating plate mechanism 103. When the rearward operating force (e.g., in a direction toward a rear side based on FIG. 1 that corresponds to a direction toward a rear side of a vehicle) is applied to the handle 101, the rotating plate mechanism 103 may be configured to rotate clockwise, and the elastic restoring contactor 602 may move from the position fixing groove 6013 along the second guide groove 6012 together with the rotation of the rotating plate mechanism 103.

Each of the first guide groove 6011 and the second guide groove 6012 may have a gradient to be inclined toward the rotating plate mechanism 103. In addition, each of the first guide groove 6011 and the second guide groove 6012 may have a gradient and a degree of curvature to be inclined and curved toward the rotating plate mechanism 103. Alternatively, each of the first guide groove 6011 and the second guide groove 6012 may have only a degree of curvature to be curved toward the rotating plate mechanism 103. As illustrated in FIG. 2, the first guide groove 6011 and the second guide groove 6012 define an approximate V shape.

When the operating force is eliminated, the gradients and the degrees of curvature of the first guide groove 6011 and the second guide groove 6012 and elastic restoring force of the spring act together, and thus, the elastic restoring contactor 602 may return to the position fixing groove 6013 from the first guide groove 6011 or the second guide groove 6012, and as a result, the rotating plate mechanism 103, the gear shifting lever 102, and the handle 101 may return to an initial position. Therefore, the mechanical gear shifting structure having a stable operating performance according to the present invention enables the gear shifting lever to actively return to the initial position after completing the gear shifting, similar to the electronic gear shifting, thereby improving a user's driving experience.

Figure 3A:
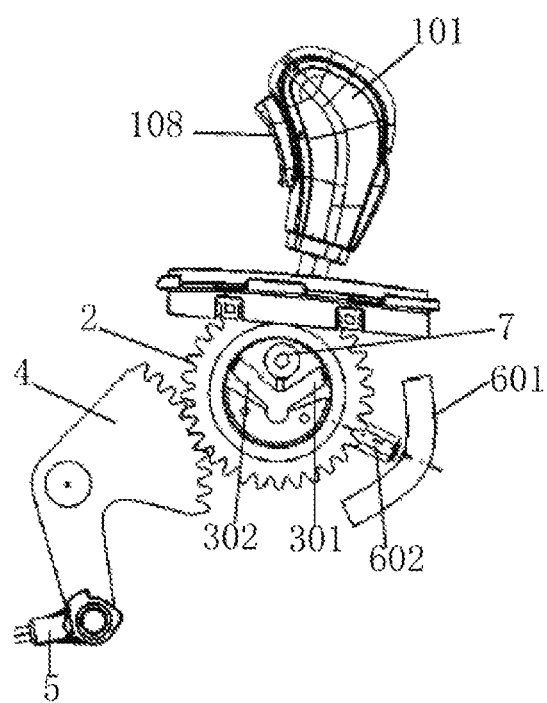
FIG. 3A is a schematic structural view of the actively restorable gear shifting device when a pawl according to the exemplary embodiment of the present invention is positioned at an intermediate position.
Figure 3B:
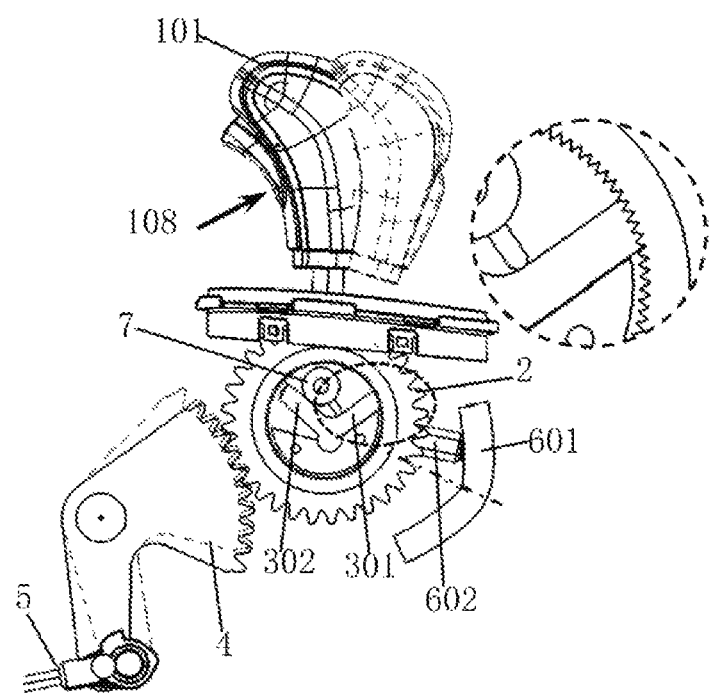
FIG. 3B is a schematic structural view of the actively restorable gear shifting device when the pawl according to the exemplary embodiment of the present invention is positioned at a first engagement position.
Figure 3C:
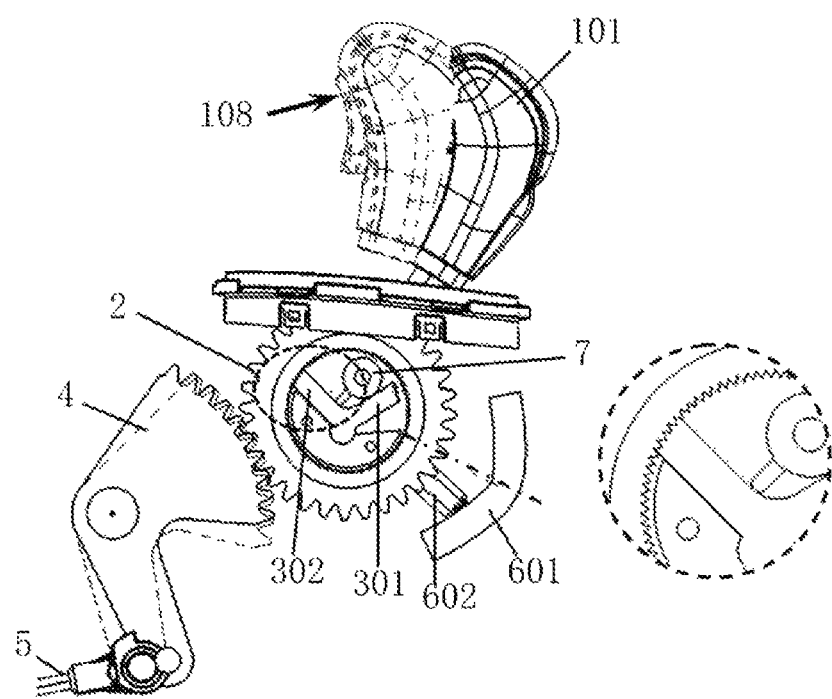
FIG. 3C is a schematic structural view of the actively restorable gear shifting device when the pawl according to the exemplary embodiment of the present invention is positioned at a second engagement position.

As illustrated in FIGS. 2 to 3C, according to the exemplary embodiment of the present invention, the gear shifting lever unit 1 may be coupled, by a pawl 3, to the driving gear 2. The pawl 3 may have an intermediate position (as illustrated in FIG. 3A), a first joining position (as illustrated in FIG. 3B), and a second joining position (as illustrated in FIG. 3C).

As illustrated in FIG. 3B, when the pawl 3 is coupled to or engaged with the driving gear 2 at the first joining position, the driving gear 2 may be rotated counterclockwise by the forward operating force applied to the handle 101, and thus, the driven gear 4 may push the gear shifting cable 5 while rotating clockwise. As illustrated in FIG. 3C, when the pawl 3 is coupled to or engaged with the driving gear 2 at the second joining position, the driving gear 2 may be rotated clockwise by the rearward operating force applied to the gear shifting lever unit 1, and thus, the driven gear 4 may pull the gear shifting cable 5 while rotating counterclockwise.

The pawl 3 may further include a rotation base portion 303, and a first pawl arm 301 and a second pawl arm 302 which protrude from the rotation base portion 303 and define a predetermined angle therebetween. For example, an angle of about 105 degrees may be defined between the first pawl arm 301 and the second pawl arm 302, and an outer circumference of the rotation base portion 303 may define a ⅔ of a circle. The driving gear 2 may have an annular shape, and an inner tooth portion 22 may be disposed on an inner circumferential surface of the driving gear 2. A free end of the first pawl arm 301 and a free end of the second pawl arm 302 may have tooth portions 3011 and 3021, respectively, that correspond to the inner tooth portion 22.

A pawl mounting holder 105 may be disposed on a second axially lateral surface of the rotating plate main body 1031. The pawl mounting holder 105 may include a mounting recess 1053 matched with the rotation base portion 303 of the pawl 3, and a first joining surface 1051 and a second joining surface 1052 disposed at both sides of the mounting recess 1053 and define a predetermined angle therebetween. The mounting recess 1053 may have a circular shape that is less than a ⅔ of a circle. For example, an angle of about 132 degrees may be defined between the first joining surface 1051 and the second joining surface 1052. The rotation base portion 303 may rotate in the mounting recess 1053. Screw apertures configured to fix the gear cover 8 may be provided in the pawl mounting holder 105.

The angle between the first pawl arm 301 and the second pawl arm 302 may be less than the angle between the first joining surface 1051 and the second joining surface 1052. The first pawl arm 301 and the second pawl arm 302 may be positioned between the first joining surface 1051 and the second joining surface 1052. A length of the first pawl arm 301 and a length of the second pawl arm 302 may satisfy the following conditions.

As illustrated in FIG. 3B, at the first joining position, the tooth portion 3011 at the free end of the first pawl arm 301 and the inner tooth portion 22 of the driving gear 2 engage with each other, but the tooth portion 3021 at the free end of the second pawl arm 302 and the inner tooth portion 22 of the driving gear 2 do not engage with each other, and a lateral surface of the first pawl arm 301 may be coupled to or engaged with to the first joining surface 1051.

As illustrated in FIG. 3C, at the second joining position, the tooth portion 3021 at the free end of the second pawl arm 302 and the inner tooth portion 22 of the driving gear 2 engage with each other, but the tooth portion 3011 at the free end of the first pawl arm 301 and the inner tooth portion 22 of the driving gear 2 do not engage with each other, and a lateral surface of the second pawl arm 302 may be coupled to or engaged with (e.g., connected) the second joining surface 1052.

As illustrated in FIG. 3A, at the intermediate position, the tooth portion 3011 at the free end of the first pawl arm 301 and the tooth portion 3021 at the free end of the second pawl arm 302 do not engage with the driving gear 2, the lateral surface of the first pawl arm 301 is not joined to the first joining surface 1051, and the lateral surface of the second pawl arm 302 is not coupled to or engaged with the second joining surface 1052.

Figure 4:
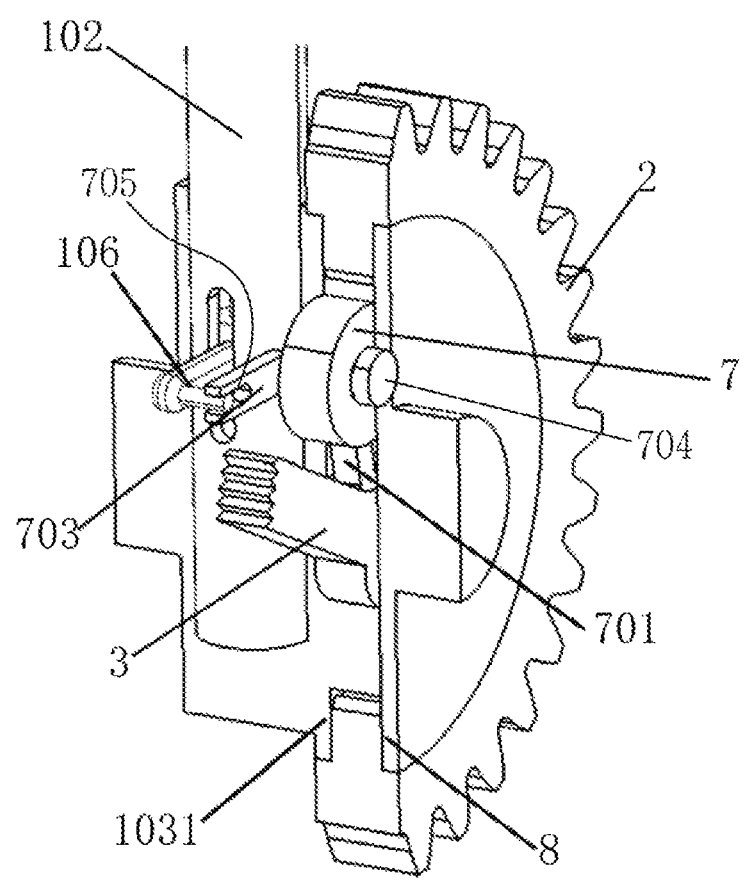
FIG. 4 is a partial perspective view taken along line A-A in FIG. 1 according to the exemplary embodiment of the present invention.

As illustrated in FIGS. 2 and 4, according to the exemplary embodiment of the present invention, the actively restorable gear shifting device may further include a rotating member 7. The rotating member 7 may be installed on the second axially lateral surface of the rotating plate main body 1031 and positioned between the first pawl arm 301 and the second pawl arm 302. An elastic rotating contactor 701, which is elastically in contact with the pawl 3, may be elastically coupled to the rotating member 7. A first end of the elastic rotating contactor 701 may be elastically mounted, by a compressive spring 702, in a mounting aperture of the rotating member 7, and a second end of the elastic rotating contactor 701 may abut the pawl 3.

When the elastic rotating contactor 701 of the rotating member 7 abuts the first pawl arm 301 and the second pawl arm 302 between the first pawl arm 301 and the second pawl arm 302, the pawl 3 may be positioned at the intermediate position, as illustrated in FIG. 3A. When the rotating member 7 rotates and the elastic rotating contactor 701 abuts the first pawl arm 301, the pawl 3 may be positioned at the first joining position, as illustrated in FIG. 3B. When the rotating member 7 rotates and the elastic rotating contactor 701 abuts the second pawl arm 302, the pawl 3 may be positioned at the second joining position, as illustrated in FIG. 3C.

According to the exemplary embodiment of the present invention, a button 108 may be installed on the handle 101, and the button 108 may be connected to the rotating member 7 via a power transmission pin 106 and a connecting member 11 and may be configured to adjust the rotation of the rotating member 7. When the button 108 is not pushed or is disengaged, the elastic rotating contactor 701 of the rotating member 7 may abut the first pawl arm 301 and the second pawl arm 302 between the first pawl arm 301 and the second pawl arm 302, and the pawl 3 may be positioned at the intermediate position, as illustrated in FIG. 3A. When a lower portion of the button 108 is pushed or otherwise engaged, the rotating member 7 may be configured to rotate counterclockwise to allow the elastic rotating contactor 701 to abut (e.g., come into close contact with) the first pawl arm 301, and the pawl 3 may be positioned at the first joining position, as illustrated in FIG. 3B. When an upper portion of the button 108 is pushed, the rotating member 7 may be configured to rotate clockwise to allow the elastic rotating contactor 701 to abut the second pawl arm 302, and the pawl 3 may be positioned at the second joining position, as illustrated in FIG. 3C.

A vertically long groove 13 may be provided in the gear shifting lever 102 to mount the power transmission pin 106 therein. A first end of the power transmission pin 106 may be connected to the button 108 via the connecting member 11 installed in the gear shifting lever 102, and a second end of the power transmission pin 106 may extend outward from the gear shifting lever 102 through the long groove 13 and connect to the rotating member 7. The sleeve 104 for connecting the gear shifting lever 102 may also include a groove that corresponds to the long groove 13.

As illustrated in FIG. 4, according to the exemplary embodiment of the present invention, a fork member 703 for connecting the power transmission pin 106 may be connected to the rotating member 7 via a rotating shaft 704 that penetrates the rotating plate main body 1031. The fork member 703 may have a slot 705 in which the power transmission pin 106 may be, and the slot 705 may have a U shape.

Figure 5A:
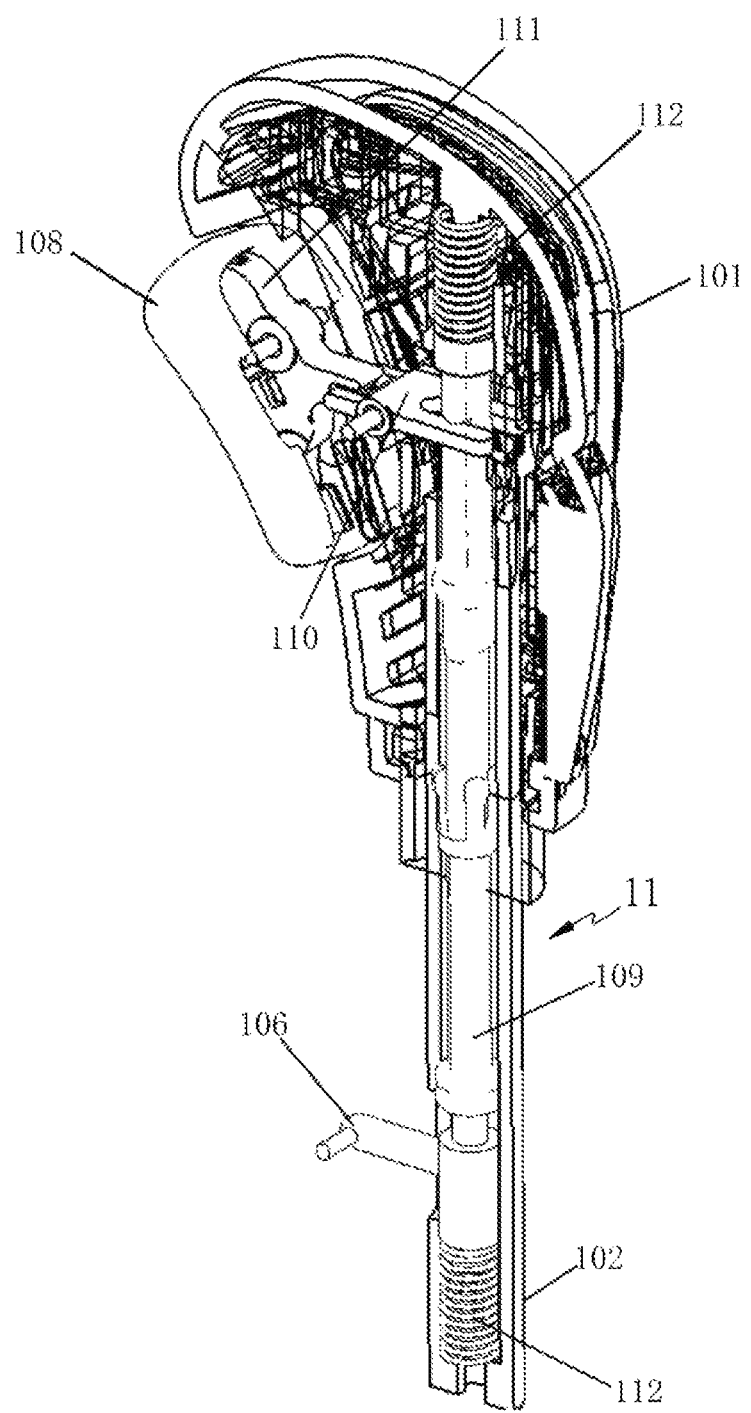
FIG. 5A is a schematic internal structural view of a handle and a gear shifting lever according to the exemplary embodiment of the present invention (in a state in which a button is not pushed)
Figure 5B:
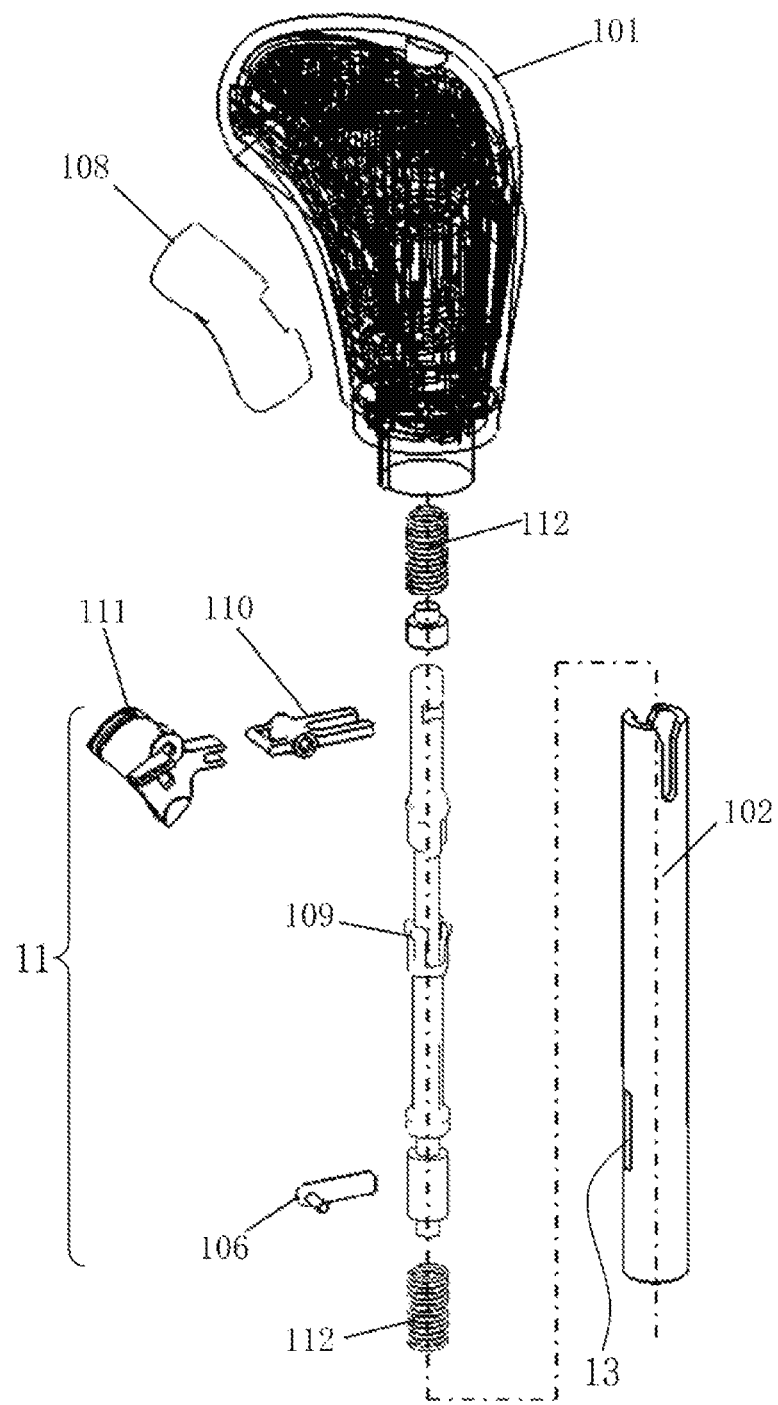
FIG. 5B is an exploded perspective view of the handle and the gear shifting lever according to the exemplary embodiment of the present invention.

As illustrated in FIGS. 5A and 5B, a first end of the power transmission pin 106 may be connected to the button 108 via the connecting member 11 installed in the gear shifting lever 102. The connecting member 11 may include a power transmission lever 109, an insertion connecting member 110, and an operating member 111. Both ends of the power transmission lever 109 may be supported, by support springs 112, at an upper end of the handle 101 and a lower end of the gear shifting lever 102, respectively. The power transmission pin 106 may be connected to a lower portion of the power transmission lever 109. The insertion connecting member 110 may be connected to an upper portion of the power transmission lever 109 through an insertion connecting groove in the power transmission lever 109. The operating member 111 may be pivotally connected to the button 108 and the insertion connecting member 110.

When the upper portion of the button 108 is pushed, the operating member 111 may pivot clockwise to move the insertion connecting member 110 and pull the power transmission lever 109 upward, thereby moving the power transmission pin 106 upward. When the lower portion of the button 108 is pushed, the operating member 111 may pivot counterclockwise to move the insertion connecting member 110 and push the power transmission lever 109 downward, thereby moving the power transmission pin 106 downward. The power transmission structure including the button, the connecting member, and the power transmission pin is not limited to the above-mentioned illustrative structure, and it may be possible to operate the button and the power transmission pin together using other structures known in the related art.

A gear shifting method using the actively restorable gear shifting device according to the exemplary embodiment of the present invention may include: positioning the pawl 3 at the first joining position (e.g., first connecting position) or the second joining position (e.g., second connecting position); implementing gear shifting by rotating the driving gear 2 counterclockwise to rotate the driven gear 4 clockwise and push the gear shifting cable 5 by applying first directional operating force to the gear shifting lever unit 1 when the pawl 3 is connected to the driving gear 2 at the first joining position, or implementing gear shifting by rotating the driving gear 2 clockwise to rotate the driven gear 4 counterclockwise and pull the gear shifting cable 5 by applying second directional operating force to the gear shifting lever unit 1 when the pawl 3 is connected to the driving gear 2 at the second connecting position; and restoring the gear shifting lever unit 1 from the operating position to an initial position by eliminating the operating force when the gear shifting is completed.

According to the exemplary embodiment of the present invention, when the button 108 is not pushed or is disengaged, the power transmission pin 106 may be positioned at an middle portion of the long groove 13, the pawl 3 may be positioned at the intermediate position, as illustrated in FIG. 3A, and the gear shifting lever unit 1 may be positioned at the initial position.

When the lower portion of the button 108 is pushed, the power transmission pin 106 may move downward along the long groove from the middle portion of the long groove 13, the rotating member 7 may be configured to rotate counterclockwise, the elastic rotating contactor 701 may abut the first pawl arm 301 together with the rotation of the rotating member 7, the first pawl arm 301 may be connected (e.g., joined, coupled, engaged) to the first joining surface 1051 of the pawl mounting holder 105 by the operation of the elastic rotating contactor 701, and the tooth portion 3011 at the free end of the first pawl arm 301 may engage with the inner tooth portion 22 of the driving gear 2, to position the pawl 3 at the first joining position, as illustrated in FIG. 3B. In particular, the clockwise rotation of the driving gear 2 may be restricted, and the force for rotating the rotating plate mechanism 103 counterclockwise may be transmitted to the first pawl arm 301 through the first joining surface 1051, and thus, the first pawl arm 301 may also rotate counterclockwise, and the driving gear 2, which engages with the first pawl arm 301, may rotate counterclockwise.

Therefore, when the handle 101 is operated and the lower portion of the button 108 is pushed, the pawl 3 may be positioned at the first joining position, and then when the handle 101 is pushed forward, the rotating plate mechanism 103 rotates counterclockwise, the driving gear 2 also rotates counterclockwise, the driven gear 4 rotates clockwise, and the gear shifting cable 5 may be pushed, and thus, a process of performing gear shifting from a drive (D) gear position to a neutral (N) gear position, from the N gear position to a rear (R) gear position, or from the R gear position to a park (P) gear position is implemented. When the handle 101 is released after the gear shifting is completed, the entire gear shifting lever unit 1 may be actively restored to the initial position, the pawl 3 may return to the intermediate position, the button 108 protrudes outward in a state in which the button 108 is not pushed by the operation of the rotating member 7, and the driving gear 2, the driven gear 4, and the gear shifting cable 5 may be stopped at positions when the gear shifting is completed.

When the upper portion of the button 108 is pushed, the power transmission pin 106 may move upward along the long groove 13 from the middle portion of the long groove 13, the rotating member 7 may be configured to rotate clockwise, the elastic rotating contactor 701 may abut the second pawl arm 302 together with the rotation of the rotating member 7, the second pawl arm 302 may be connected to the second joining surface 1052 of the pawl mounting holder 105 by the operation of the elastic rotating contactor 701, and the tooth portion 3021 at the free end of the second pawl arm 302 may engage with the inner tooth portion 22 of the driving gear 2, and thus, the pawl 3 may be positioned at the second joining position, as illustrated in FIG. 3C. In particular, the counterclockwise rotation of the driving gear 2 may be restricted, and the force for rotating the rotating plate mechanism 103 clockwise may be transmitted to the second pawl arm 302 through the second joining surface 1052, and thus, the second pawl arm 302 may also rotate clockwise, and the driving gear 2, which engages with the second pawl arm 302, may rotate clockwise.

Therefore, when the handle 101 is operated and the upper portion of the button 108 is pushed, the pawl 3 may be positioned at the second joining position, and then when the handle 101 is pulled rearward, the rotating plate mechanism 103 rotates clockwise, the driving gear 2 also rotates clockwise, the driven gear 4 rotates counterclockwise, and the gear shifting cable 5 is pulled, and thus, a process of performing gear shifting from the P gear position to the R gear position, from the R gear position to the N gear position, or from the N gear position to the D gear position may be implemented. When the handle 101 is released after the gear shifting is completed, the entire gear shifting lever unit 1 may be actively restored to the initial position, the pawl 3 may return to the intermediate position, the button 108 protrudes outward in a state in which the button 108 is not pushed by the operation of the rotating member 7, and the driving gear 2, the driven gear 4, and the gear shifting cable 5 may be stopped at positions when the gear shifting is completed.

Figure 6A:
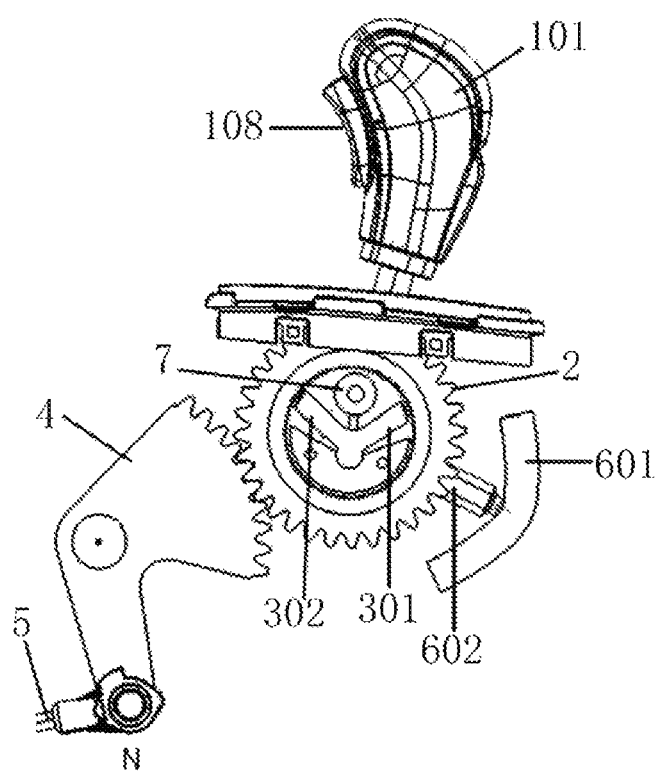
FIGS. 6A to 6D are views schematically illustrating a process of changing a gear position from a neutral (N) gear position to a drive (D) gear position by using the actively restorable gear shifting device according to the exemplary embodiment of the present invention.
Figure 6B:
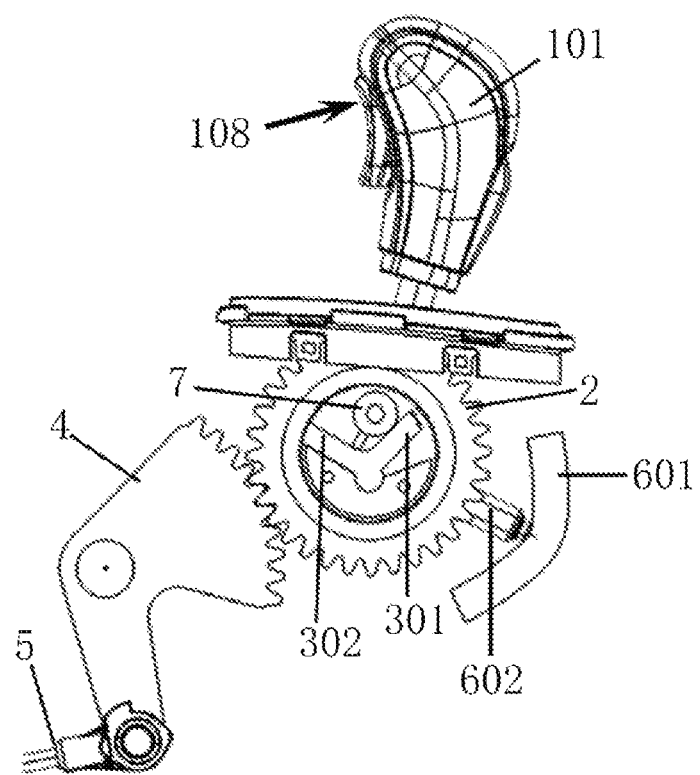

The gear shifting method using the actively restorable gear shifting device according to the exemplary embodiment of the present invention will be described with reference to the example related to the gear shifting "from the N gear position to the D gear position", as illustrated in FIGS. 6A to 6D. As illustrated in FIG. 6A, the gear shifting lever unit 1 may be positioned at the initial position, and the pawl 3 may be positioned at the intermediate position. As illustrated in FIG. 6B, when the upper portion of the button 108 is pushed, the elastic rotating contactor 701 may push the second pawl arm 302, the second pawl arm 302 may be connected to the second joining surface 1052, and the tooth portion 3021 at the free end of the second pawl arm 302 may engage with the gear, and thus, the pawl 3 may be positioned at the second joining position.

Figure 6C:
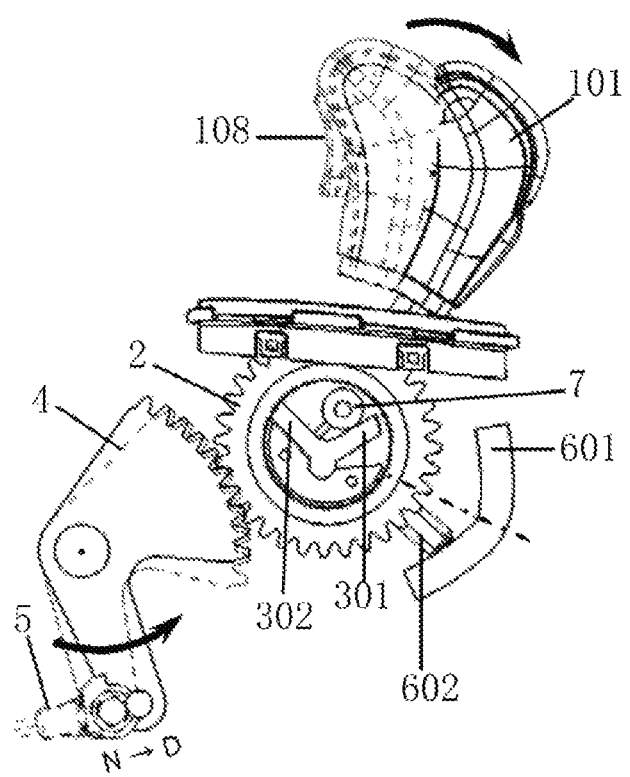
Figure 6D:
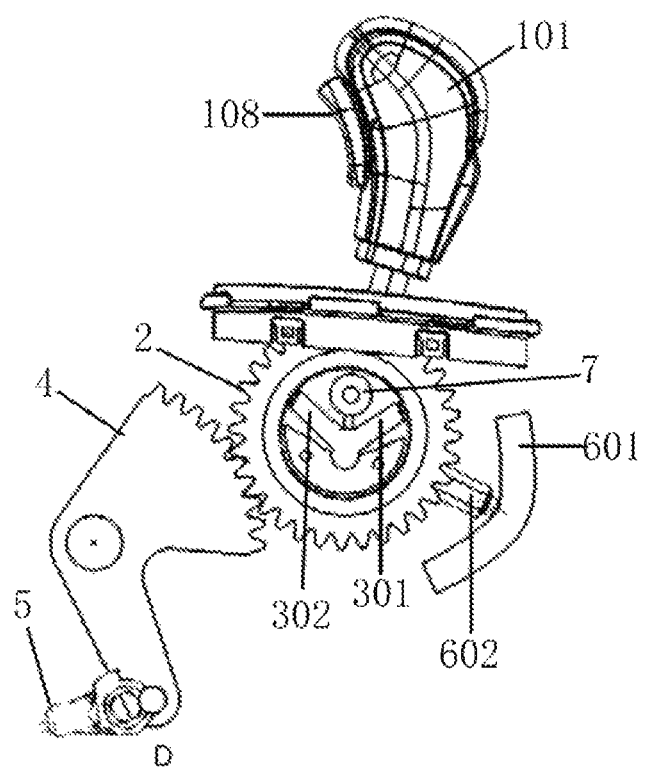

As illustrated in FIG. 6C, when the handle 101 is pulled rearward, the rotating plate mechanism 103 may be configured to rotate clockwise, the pawl 3 may move and rotate the driving gear 2 clockwise, the driven gear 4 may be configured to rotate counterclockwise, and the gear shifting cable 5 may be pulled, and thus, the gear shifting from the N gear position to the D gear position may be implemented. As illustrated in FIG. 6D, when the handle 101 is released after the gear shifting is completed, the entire gear shifting lever unit 1 may be actively restored to the initial position, the pawl 3 may return to the intermediate position, the button 108 protrudes outward in a state in which the button 108 is not pushed by the operation of the rotating member 7, and the driving gear 2, the driven gear 4, and the gear shifting cable 5 may be stopped at the D gear position.

The present invention may implement the gear shifting function and maintain stability of the mechanical gear shifting, and as a result, it may be possible to implement the electronic gear shifting mode such as shift by wire (SBW) only by changing the gear shifting device without changing other members in the mechanical gear shifting system (e.g., the shift by cable (SBC) gear shifting system) in the related art. Accordingly, the present invention may improve a user's driving experience and decrease costs in comparison with the SBW. The gear shifting device according to the present invention may have the gear shifting mode such as electronic gear shifting and may prevent instability of the electronic gear shifting (e.g., a vehicle cannot be normally operated in the event of a power and circuit failure) and a safety risk.

As the foregoing, the present invention has been described in detail with reference to the exemplary embodiments. However, it will be understood by those skilled in the art that the above-mentioned exemplary embodiments may be modified without departing from the principle and the spirit of the present invention and the scope of the present invention is defined by the appended claims and the equivalent thereto.

DESCRIPTION OF SYMBOLS

1: Gear shifting lever unit
2: Driving gear
3: Pawl
4: Driven gear
5: Gear shifting cable
6: Restoring mechanism
7: Rotating member
8: Gear cover
9: Screw
101: Handle
102: Gear shifting lever
103: Rotating plate mechanism
1031: Rotating plate main body
1032: Rotating plate shaft
104: Sleeve
105: Pawl mounting holder
1051: First joining surface
1052: Second joining surface
1053: Mounting recess
106: Power transmission pin
107: Elastic contactor mounting holder
108: Button
109: Power transmission lever
110: Insertion connecting member
111: Operating member
112: Support spring
301: First pawl arm
302: Second pawl arm
303: Rotation base portion
601: Guide member
6011: First guide groove
6012: Second guide groove
6013: Position fixing groove
602: Elastic restoring contactor
603: Restoring spring
604: Spring seat
701: Elastic rotating contactor
702: Compressive spring
703: Fork member

What is claimed is:

1. An actively restorable gear shifting device, comprising:
a gear shifting lever unit configured to be moved from an initial position to an operating position by external operating force and connected to a restoring mechanism to be restored to the initial position when the operating force is eliminated;
a driving gear connected to the gear shifting lever unit to be rotated by a motion of the gear shifting lever unit; and
a driven gear which engages with an outer tooth portion of the driving gear, connects to a gear shifting cable, and implements gear shifting by pushing or pulling the gear shifting cable by a rotation of the driving gear,
wherein the gear shifting lever unit connected to the driving gear by a pawl, and the pawl includes a first joining position and a second joining position,
wherein when the pawl is connected to the driving gear at a first joining position, the driving gear rotates in a first rotation direction by first directional operating force applied to the gear shifting lever unit, the driven gear rotates in a second rotation direction, and the gear shifting cable is pushed, and
wherein when the pawl is connected to the driving gear at a second joining position, the driving gear rotates in the second rotation direction by second directional operating force applied to the gear shifting lever unit, the driven gear rotates in the first rotation direction, and the gear shifting cable is pulled.

2. The gear shift apparatus of claim 1, wherein the gear shifting lever unit includes:
a handle mounted on an upper portion of the gear shifting lever; and
a rotating plate mechanism having a rotating plate main body, and a rotating plate shaft installed on a first axially lateral surface of the rotating plate main body and connected to a lower portion of the gear shifting lever,
wherein the rotating plate mechanism is rotated in the first rotation direction from the initial position by the first directional operating force applied to the handle, and
wherein the rotating plate mechanism is rotated in the second rotation direction from the initial position by the second directional operating force applied to the handle.

3. The gear shift apparatus of claim 2, wherein the restoring mechanism includes:
a guide member and an elastic restoring contactor fixedly installed at an outer portion of the rotating plate mechanism;
a first guide groove, a second guide groove, and a position fixing groove provided in a lateral surface of the guide member that faces the rotating plate mechanism,
wherein the position fixing groove is disposed between the first guide groove and the second guide groove and connected to the first guide groove and the second guide groove,
wherein a first end of the elastic restoring contactor is elastically joined to the rotating plate mechanism, and
wherein a second end of the elastic restoring contactor is positioned and fixed in the position fixing groove by elastic force when the rotating plate mechanism does not rotate.

4. The gear shift apparatus of claim 3, wherein:
the elastic restoring contactor is moved from the position fixing groove with the first guide groove or the second guide groove by operating force applied to the handle together with the rotation of the rotating plate mechanism, and
when the operating force is eliminated, the elastic restoring contactor is restored to the position fixing groove from the first guide groove or the second guide groove, and the rotating plate mechanism, the gear shifting lever, and the handle return to the initial position.

5. The gear shift apparatus of claim 4, wherein each of the first guide groove and the second guide groove has a gradient to be inclined toward the rotating plate mechanism.

6. The gear shift apparatus of claim 5, wherein each of the first guide groove and the second guide groove has a degree of curvature to be curved toward the rotating plate mechanism.

7. The gear shift apparatus of claim 5, wherein the rotating plate mechanism further includes an elastic contactor mounting holder, and the elastic restoring contactor is elastically mounted, by a restoring spring, on the elastic contactor mounting holder.

8. The gear shift apparatus claim 7, wherein the pawl includes:
  a rotation base portion; and
  a first pawl arm and a second pawl arm which protrude from the rotation base portion and define a predetermined angle therebetween,
  wherein the driving gear has an annular shape, an inner tooth portion is provided on an inner circumferential surface of the driving gear, and tooth portions, which correspond to the inner tooth portion, are provided at a free end of the first pawl arm and a free end of the second pawl arm, respectively.

9. The gear shift apparatus of claim 8, wherein a pawl mounting holder is installed on a second axially lateral surface of the rotating plate main body, the pawl mounting holder includes:
  a mounting recess which is matched with the rotation base portion of the pawl; and
  a first joining surface and a second joining surface which are provided at both sides of the mounting recess and define a predetermined angle therebetween,
  wherein the rotation base portion is rotatable in the mounting recess.

10. The gear shift apparatus of claim 9, wherein:
  the angle between the first pawl arm and the second pawl arm is less than the angle between the first joining surface and the second joining surface, the first pawl arm and the second pawl arm are positioned between the first joining surface and the second joining surface, and a length of the first pawl arm and a length of the second pawl arm satisfy a condition in which:
  at the first joining position, the tooth portion at the free end of the first pawl arm and the inner tooth portion of the driving gear engage with each other, while the tooth portion at the free end of the second pawl arm and inner tooth portion of the driving gear do not engage with each other, and a lateral surface of the first pawl arm is connected to the first joining surface, and
  at the second joining position, the tooth portion at the free end of the second pawl arm and the inner tooth portion of the driving gear engage with each other, while the tooth portion at the free end of the first pawl arm and the inner tooth portion of the driving gear do not engage with each other, and a lateral surface of the second pawl arm is connected to the second joining surface.

11. The gear shift apparatus of claim 10, wherein the pawl further includes an intermediate position, and the first pawl arm and the second pawl arm do not engage with the driving gear at the intermediate position.

12. The gear shift apparatus of claim 11, further comprising:
  a rotating member, wherein the rotating member is installed on the second axially lateral surface of the rotating plate main body and positioned between the first pawl arm and the second pawl arm, an elastic rotating contactor, which is elastically in contact with the pawl, is elastically connected to the rotating member,
  wherein the pawl is positioned at the intermediate position when the elastic rotating contactor of the rotating member abuts the first pawl arm and the second pawl arm between the first pawl arm and the second pawl arm,
  wherein the pawl is positioned at the first joining position when the rotating member rotates and the elastic rotating contactor abuts the first pawl arm, and
  wherein the pawl is positioned at the second joining position when the rotating member rotates and the elastic rotating contactor abuts the second pawl arm.

13. The gear shift apparatus of claim 12, further comprising:
  a button is installed on the handle, wherein the button is connected to the rotating member via a power transmission pin and a connecting member and is configured to adjust the rotation of the rotating member,
  wherein the elastic rotating contactor of the rotating member abuts the first pawl arm and the second pawl arm between the first pawl arm and the second pawl arm and the pawl is positioned at the intermediate position when the button is disengaged,
  wherein the rotating member rotates in the first rotation direction to allow the elastic rotating contactor to abut the first pawl arm and the pawl is positioned at the first joining position when a lower portion of the button is pushed, and
  wherein the rotating member rotates in the second rotation direction to allow the elastic rotating contactor to abut the second pawl arm and the pawl is positioned at the second joining position when an upper portion of the button is pushed.

14. The gear shift apparatus of claim 13, wherein: the gear shifting lever has a vertically long groove in which the power transmission pin is mounted, a first end of the power transmission pin is connected to the button via a connecting member installed in the gear shifting lever, and a second end of the power transmission pin protrudes outward from the gear shifting lever through the long groove and connects to the rotating member.

15. The gear shift apparatus of claim 13, further comprising:
  a fork member for connected the power transmission pin and is connected to the rotating member via a rotating shaft that penetrates the rotating plate main body,
  wherein the fork member includes a slot in which the power transmission pin is inserted.

16. The gear shift apparatus of claim 14, wherein:
  the power transmission pin is positioned at a middle portion of the long groove when the button is disengaged,
  the power transmission pin moves downward along the long groove from the middle portion of the long groove to allow the rotating member to rotate in the first rotation direction when the lower portion of the button is pushed, and
  the power transmission pin moves upward along the long groove from the middle portion of the long groove to allow the rotating member to rotate in the second rotation direction when the upper portion of the button is pushed.

17. A gear shifting method using the actively restorable gear shifting device according to claim 1, comprising:
  positioning the pawl at the first joining position or the second joining position;
  implementing gear shifting by rotating the driving gear in the first rotation direction to rotate the driven gear in the second rotation direction and push the gear shifting cable by applying the first directional operating force to the gear shifting lever unit when the pawl is connected to the driving gear at the first joining position, or implementing gear shifting by rotating the driving gear in the second rotation direction to rotate the driven gear in the first rotation direction and pull the gear shifting cable by applying the second directional operating force to the gear shifting lever unit when the pawl is connected to the driving gear at the second joining position; and restoring the gear shifting lever unit from the operating position to the initial position by eliminating the operating force when the gear shifting is completed.

* * * * *